United States Patent [19]

Kuo

[11] Patent Number: 5,266,847
[45] Date of Patent: Nov. 30, 1993

[54] HIGH SPEED DATA TRANSCEIVER

[75] Inventor: James R. Kuo, Cupertino, Calif.

[73] Assignee: National Semiconductor Corporation, Santa Clara, Calif.

[21] Appl. No.: 635,773

[22] Filed: Dec. 28, 1990

[51] Int. Cl.[5] ..................... H03K 19/692; H03K 3/01
[52] U.S. Cl. .................................... 307/475; 307/456; 307/296.6; 307/270
[58] Field of Search ..................... 307/475, 296.6, 270, 307/456

[56] References Cited

U.S. PATENT DOCUMENTS

| | | | |
|---|---|---|---|
| 4,751,404 | 6/1988 | Yuen | 307/296.6 |
| 4,855,622 | 8/1989 | Johnson | 307/456 |
| 4,972,106 | 11/1990 | Ruijs | 307/456 |
| 4,980,579 | 12/1990 | McDonald et al. | 307/475 |
| 5,015,888 | 5/1991 | Ovens | 307/296.6 |
| 5,017,813 | 5/1991 | Galbraith et al. | 307/475 |
| 5,019,728 | 5/1991 | Sanwo et al. | 307/475 |
| 5,023,487 | 6/1991 | Wellheuser et al. | 307/475 |
| 5,034,632 | 7/1991 | Jansson et al. | 307/475 |
| 5,041,743 | 8/1991 | Matsumoto | 307/475 |

FOREIGN PATENT DOCUMENTS

| | | |
|---|---|---|
| 0199374 | 10/1986 | European Pat. Off. . |
| WO 85/02507 | 6/1985 | PCT Int'l Appl. . |
| WO 85/04774 | 10/1985 | PCT Int'l Appl. . |
| WO 86/01055 | 2/1986 | PCT Int'l Appl. . |

OTHER PUBLICATIONS

Boris Bertolucci; Fastbus Dual-Port memory and Display Diagnostic Module: IEEE Transaction on Nuclear Science, vol. NS-34, No. 1, Feb. 1987; pp. 253-275.

*Primary Examiner*—Edward P. Westin
*Assistant Examiner*—Richard Roseen
*Attorney, Agent, or Firm*—Limbach & Limbach

[57] ABSTRACT

The driver stage of a high speed multi-channel data transceiver in accordance with the present invention includes a bias voltage regulator that regulates base drive for each transceiver driver stage to achieve fast and stable propagation delay over varying supply and temperature conditions. An input capacitor connected to the voltage bias input line provides instant base drive to the output driver for fast turn-on without adding DC current. Two pairs of Miller capacitor transistors connected between the transceiver's driver stage data input and the collector of the output driver control driver output slew rate. A discharge capacitive network connected to the base of the output driver provides an instant discharge path when the driver is disabled.

On the receiver side, an ECC-to-TTL converter stage reduces node capacitance and provides fast turn-off. A TTL output buffer that uses the backplane transceiver logic ground as ground consumes zero power when the receiver is in the high impedance state.

8 Claims, 12 Drawing Sheets

HIGH SPEED DATA TRANSCEIVER

BACKGROUND OF THE INVENTION

The present invention relates to line interface devices and, in particular, to a high speed Futurebus+ data transceiver that meets the IEEE 1194.1 standard for backplane transceiver logic (BTL).

A data transceiver (TRANSmitter/reCEIVER) is a read/write terminal capable of transmitting information to and receiving information from a transmission medium. A transceiver typically includes a line driver stage and a receiver stage. The line driver amplifies digital signal outputs from a computer system so that the signals can be properly transmitted on the transmission medium. Conventional line drivers usually include level shifting capability to provide compatibility with different integrated circuit technologies (e.g., TTL) that might be used in the computer's internal logic. The receiver is typically a differential amplifier that receives signals from the transmission medium and provides an output representative of digital information received from the medium.

Transceiver circuits may be designed for general-purpose applications or may be designed for a more specific, industry standard data-communications configuration.

One such industry standard is the so-called IEEE 896.1 Futurebus+ standard. The Futurebus+ standard provides a protocol for implementing an internal computer bus architecture.

Figure 1:
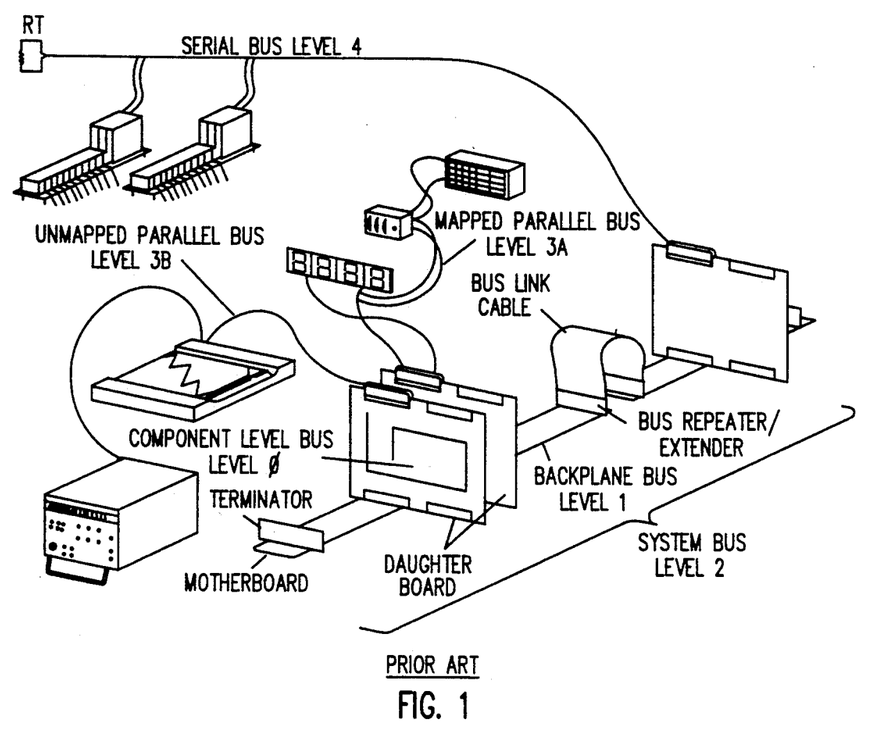
FIG. 1 is a pictorial illustration of the hierarchy of bus levels in a Futurebus+ system.

FIG. 1 shows the hierarchy of bus levels utilizable in a Futurebus+ system.

Figure 2:
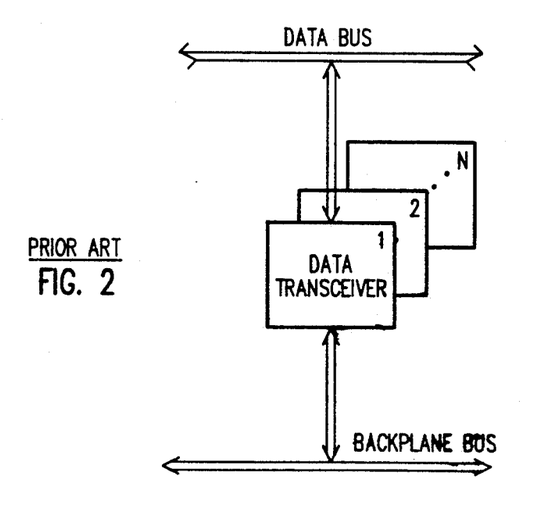
FIG. 2 is a block diagram illustrating the placement of a data transceiver between the backplane bus of a Futurebus+ system and the data bus of a processor in the Futurebus+ system.

FIG. 2 shows the positioning of a data transceiver between the backplane bus of a Futurebus+ system and the data bus of a processor internal to that system to facilitate communications between the processor and the rest of the system.

While integrated circuit versions of data transceivers utilizable in conjunction with Futurebus+ architectures have been available, both the driver stages and receivers of these transceivers have exhibited deficiencies. With respect to the driver stages, past Futurebus+ transceivers exhibit unsymmetrical skew; that is, the high to low transitions are too fast and the low to high transitions are too slow. Furthermore, conventional Futurebus+ drivers exhibit poor temperature and supply performance and consume too much power. On the receiver side, conventional Futurebus+ transceiver implementations exhibit enormous ground bouncing, with attendant stability and skew problems.

Therefore, it would be highly desirable to have available a data transceiver that is utilizable in Futurebus+ applications and that provides slew rate control, exhibits better temperature and supply AC performance and consumes less power.

SUMMARY OF THE INVENTION

The present invention provides a backplane transceiver logic data transceiver utilizable in compliance with the IEEE 986.1 Futurebus+ standard.

The driver stage of a high speed multi-channel data transceiver in accordance with the present invention includes a bias voltage regulator that regulates base drive for each transceiver driver stage to achieve fast and stable propagation delay over varying supply and temperature conditions. An input capacitor connected to the voltage bias input line provides instant base drive to the output driver for fast turn-on without adding DC current. Two pairs of Miller capacitor transistors connected between the transceiver's driver stage data input and the collector of the output driver control driver output slew rate. A discharge capacitive network connected to the base of the output driver provides an instant discharge path when the driver is disabled.

On the receiver side, an ECC-to-TTL converter stage reduces node capacitance and provides fast turn-off. A TTL output buffer consumes zero power when the receiver is in the high impedance state.

A better understanding of the features and advantages of a data transceiver in accordance with the present invention will be obtained by reference to the following detailed description and accompanying drawings which set forth an illustrative embodiment in which the features of the invention are utilized.

DETAILED DESCRIPTION OF THE INVENTION

Figure 3:
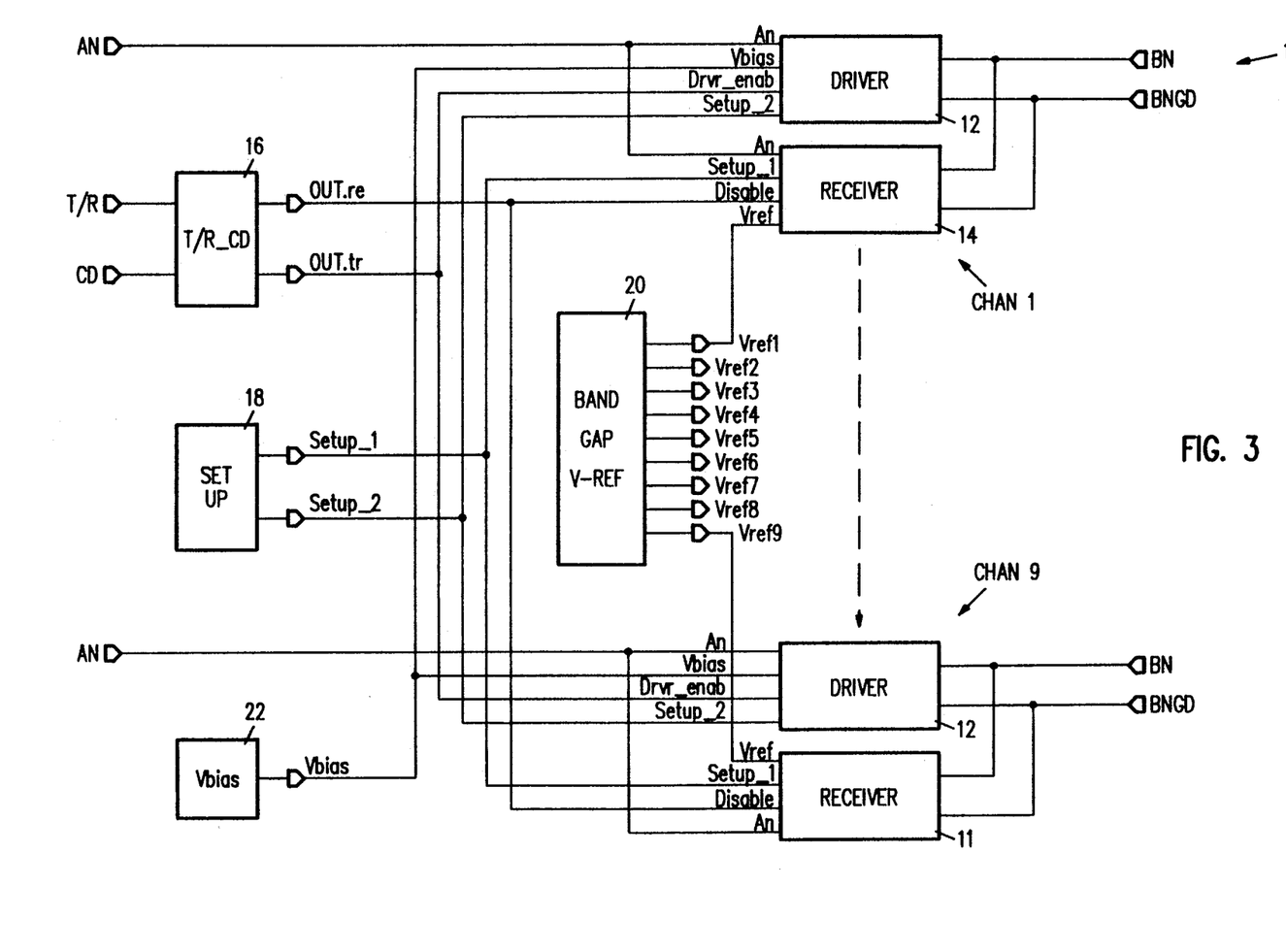
FIG. 3 is a block diagram illustrating a high speed data transceiver in accordance with the present invention.

FIG. 3 shows a block diagram of a high speed data transceiver 10 in accordance with the present invention. Transceiver 10 includes nine channels CHAN1--CHAN9, each channel having a driver 12 and receiver 14 pair. A transmit/receive control with chip disable (T/R&CD) block 16, which is described in greater detail below, enables and disables drivers 12 and receivers 14. A setup block 18 insures that the driver 12 and receiver 14 outputs are glitch-free during power-up and power-down. A bandgap voltage reference (V-REF) block 20 provides reference voltage inputs to all receivers 14. In accordance with an aspect of the present invention, and as described in greater detail below, a voltage bias (Vbias) block 22 regulates base drive for each driver 12 to achieve fast and stable propagation delay over varying operating conditions of supply and temperature.

Figure 4A:
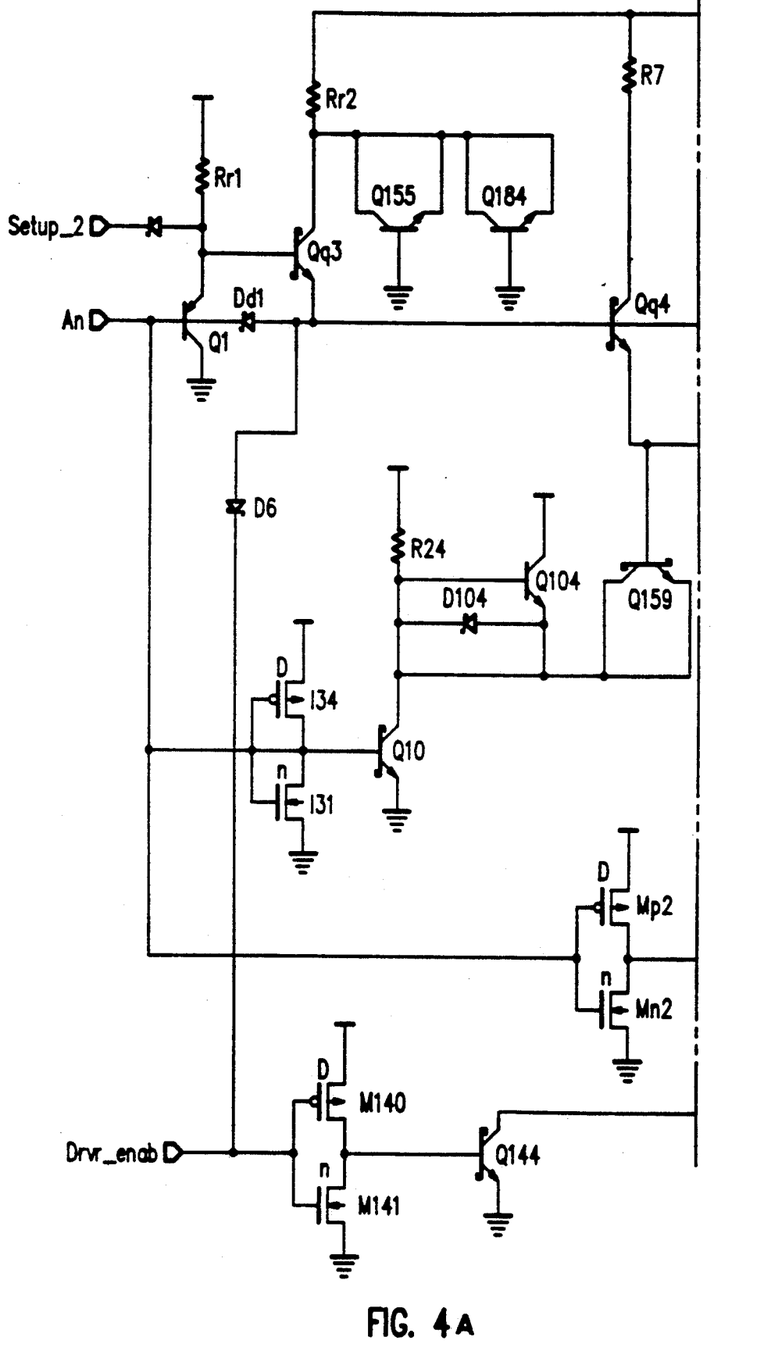
FIGS. 4a and 4b are schematic diagrams illustrating a driver stage circuit utilizable in the data transceiver shown in FIG. 3.
Figure 4B:
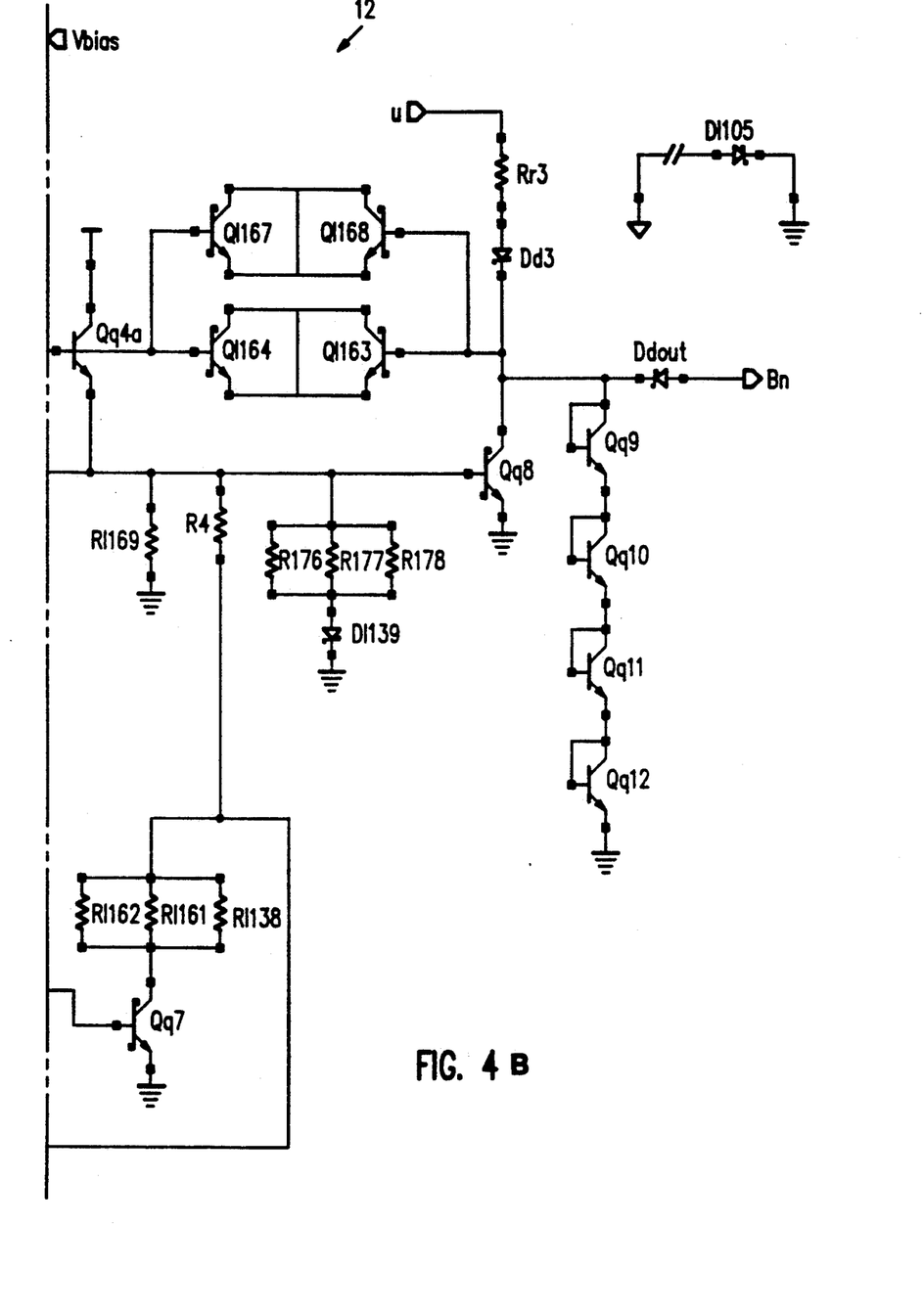

FIGS. 4a and 4b show an embodiment of a driver circuit 12 in accordance with the present invention. Driver 12 is basically an inverter which can sink 80 ma at its output Bn with Vol less than 1.1 volts IEEE PI 194.1 (BTL standard). As described below, the driver 12 exhibits low skew (2 ns typical), controlled rise/fall time (2-5 ns) and fast propagation delay (4-5 ns).

As shown in FIG. 4 when the data input An to driver 12 is low, both transistor Qq4 and transistor Qq4a are off. Thus, output transistor Qq8 stays off because of lack of base drive. When the data input An goes high, both transistor Qq4 and transistor Qq4a provide base drive current to output transistor Qq8 so that the collector of output transistor Qq8 sinks at least 80 ma current from its load.

Capacitor Q155 provides instant base drive to output transistor Qq8 for fast turn on without adding more DC current (more DC power). Furthermore, two pairs of Miller capacitor transistor Q167/Q168 and Q163/Q164 are used to control driver output slew rate.

Figure 5:
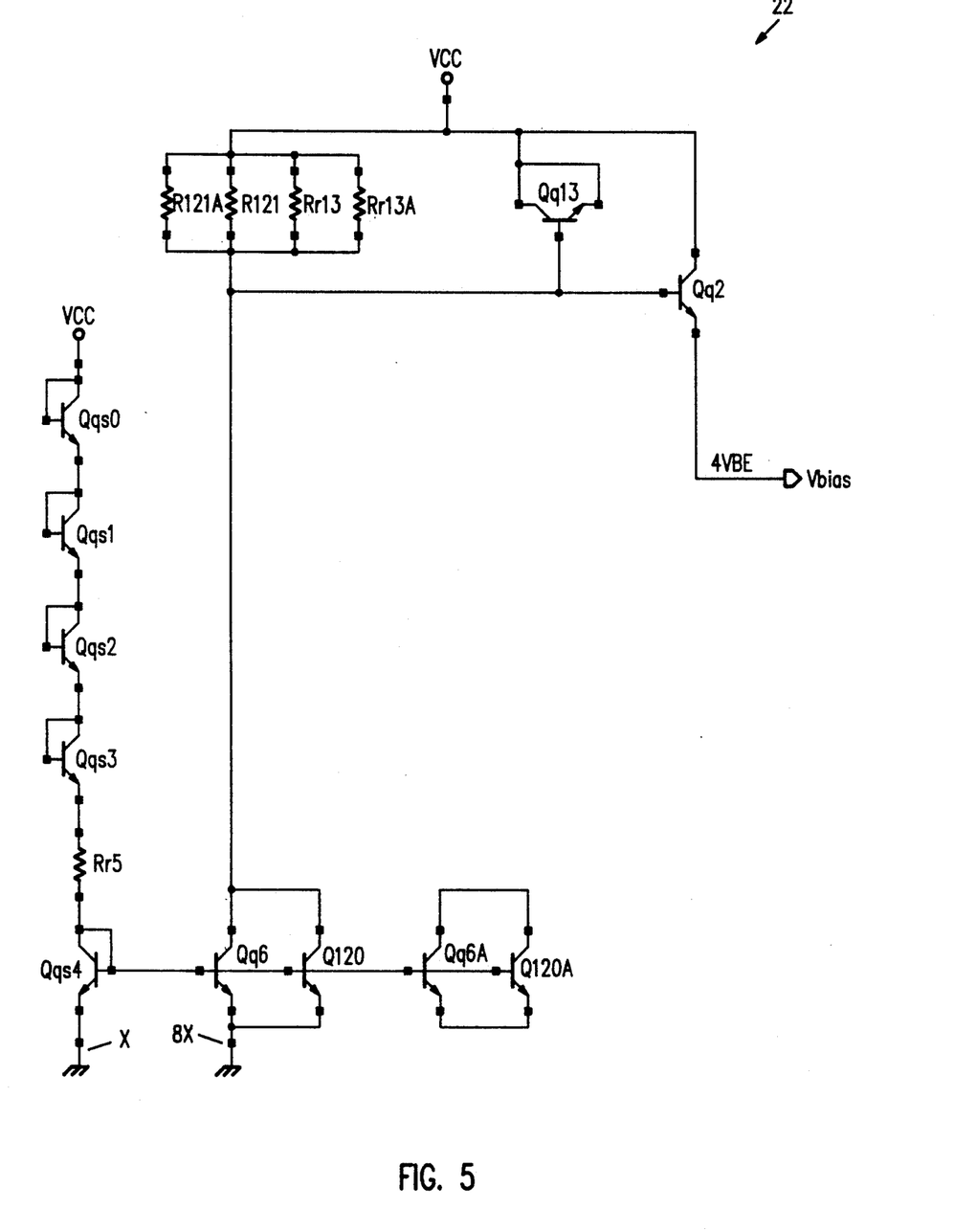
FIG. 5 is a schematic diagram illustrating a voltage bias circuit utilizable in the data transceiver shown in FIG. 3.

The Vbias signal to driver 12 always remains 4 Vbe above ground. Referring to FIG. 5, regardless of the level of the supply voltage Vcc, when the temperature goes high, Vbias decreases and vice versa. More specifically, FIG. 5 shows a voltage bias circuit 22 that includes a serial string including diode-connected transistors Qqs0-Qqs4 and a 2K resistor RrS connected between the supply voltage Vcc and ground. Connected in parallel between Vcc and ground is a resistive network (R121, R121A, Rr13, Rr13A) having a resistance ⅛ that of resistor Rr5. Thus, the output voltage Vbias of the voltage bias circuit 22 equals the supply voltage Vcc minus terms representing the X/8X voltage division of the parallel networks and the voltage drop $V_{BE}$ for npn output transistor Qq2. This translates to the following:

$$V_{bias} = V_{cc} - 8\left(\frac{V_{cc} - 5V_{BE}}{R}\right)\frac{R}{8} - V_{BE}$$
$$= 4V_{BE}$$

The base drive current Ib of output transistor Qq8 of driver stage 10 is given by $$I_b = 3\left(\frac{V_{bias} - V_{sat} - V_{be}}{R1} + \frac{V_{bias} - V_{sat} - V_{be}}{R2}\right)$$
$$= 3\left(\frac{3V_{be} - V_{sat}}{R1} + \frac{2V_{be} - V_{sat}}{R2}\right)$$
$$= 3V_{be}(3/R1 + 2/R2)$$

Base drive current Ib tends to decrease with rising temperature; i.e. less base drive is provided to output transistor Qq8 as temperature increases. Because the storage time of transistor Qq8 increases with temperature, the above-described voltage bias scheme retards the temperature dependency phenomenon.

During driver turn-off, diodes Qq4/Qq4a can be turned off quickly through input Schottkey diode Dd1. However, the storage charge of output transistor Qq8 can only be discharged through resistor R176/R177/R178 and Schottkey diode D139.

With respect to the turn-on/turn-off and controllable slew rate issues, reference is made to FIG. 4A. As shown therein, when input signal An is applied to the base of npn transistor Q10, transistor Q10 turns on and provides a quick discharge path from the base of output transistor Qq8 (see FIG. 4B). A capacitive discharge network that includes capacitor Q159 is connected between the base of output transistor Qq8 and ground for providing an instant discharge path when the driver is disabled. Furthermore, Miller capacitors Q155 and Q184 are connected between data input to the driver stage and output transistor Qq8 for controlling driver output slew rate.

When input signal An is low and transistor Q10 is off, capacitor Q159 provides instant turn-on current for output transistor Qq8. Current flows from capacitors Q155 and Q184 to the base of transistor Qq8 providing instant turn-on. The falling edge of the output signal is controlled by the Miller capacitance provided by capacitors Q163, Q164, Q167 and Q168. Resistors R176, R177 and R178 are used to control the rising edge of the output.

An instant discharge path is also provided through capacitor transistor Q159 by turning on transistor Q10.

Figure 6A:
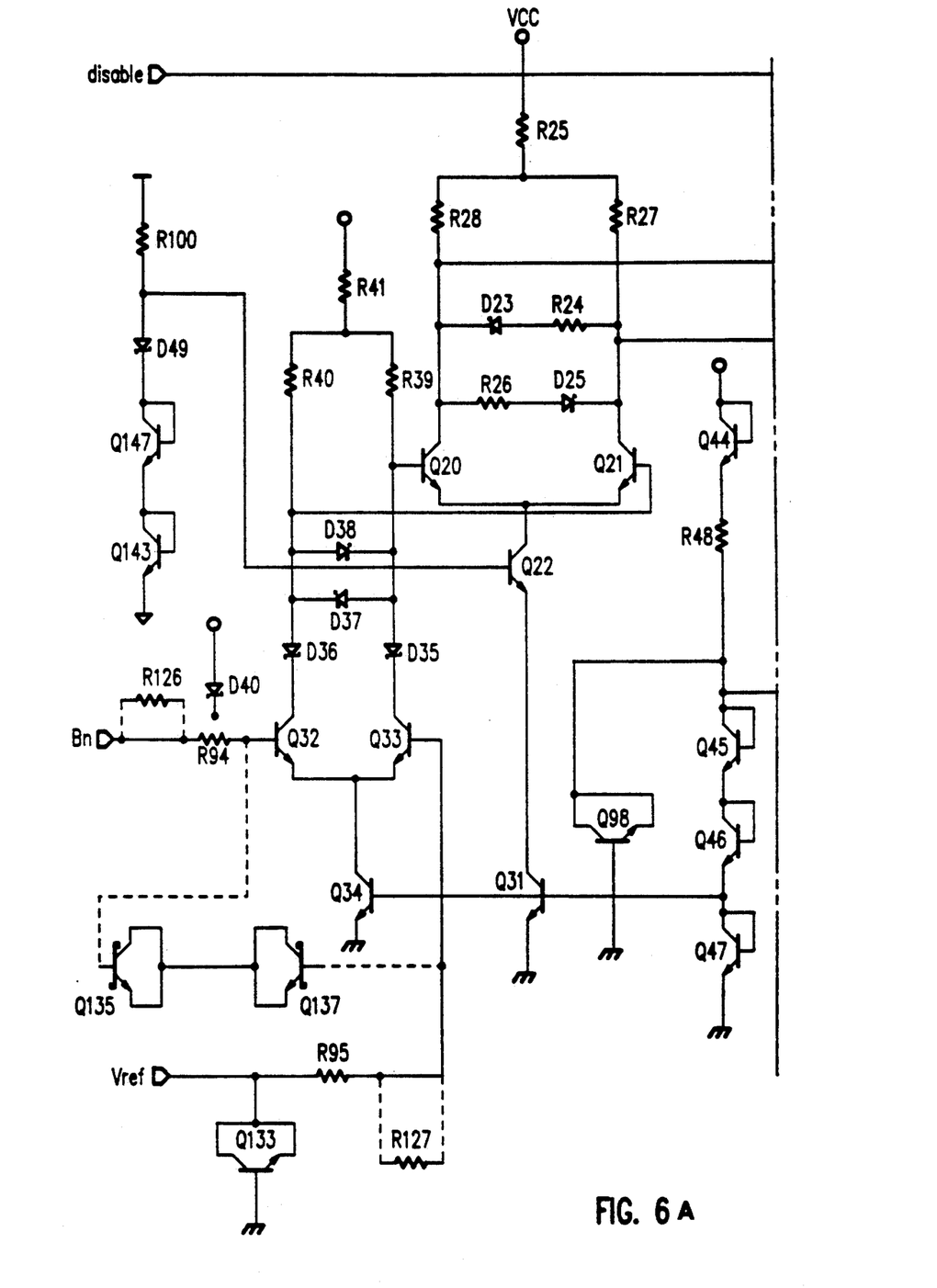
FIGS. 6a-6c are schematic diagrams illustrating a receiver circuit utilizable in the data transceiver shown in FIG. 3.
Figure 6B:
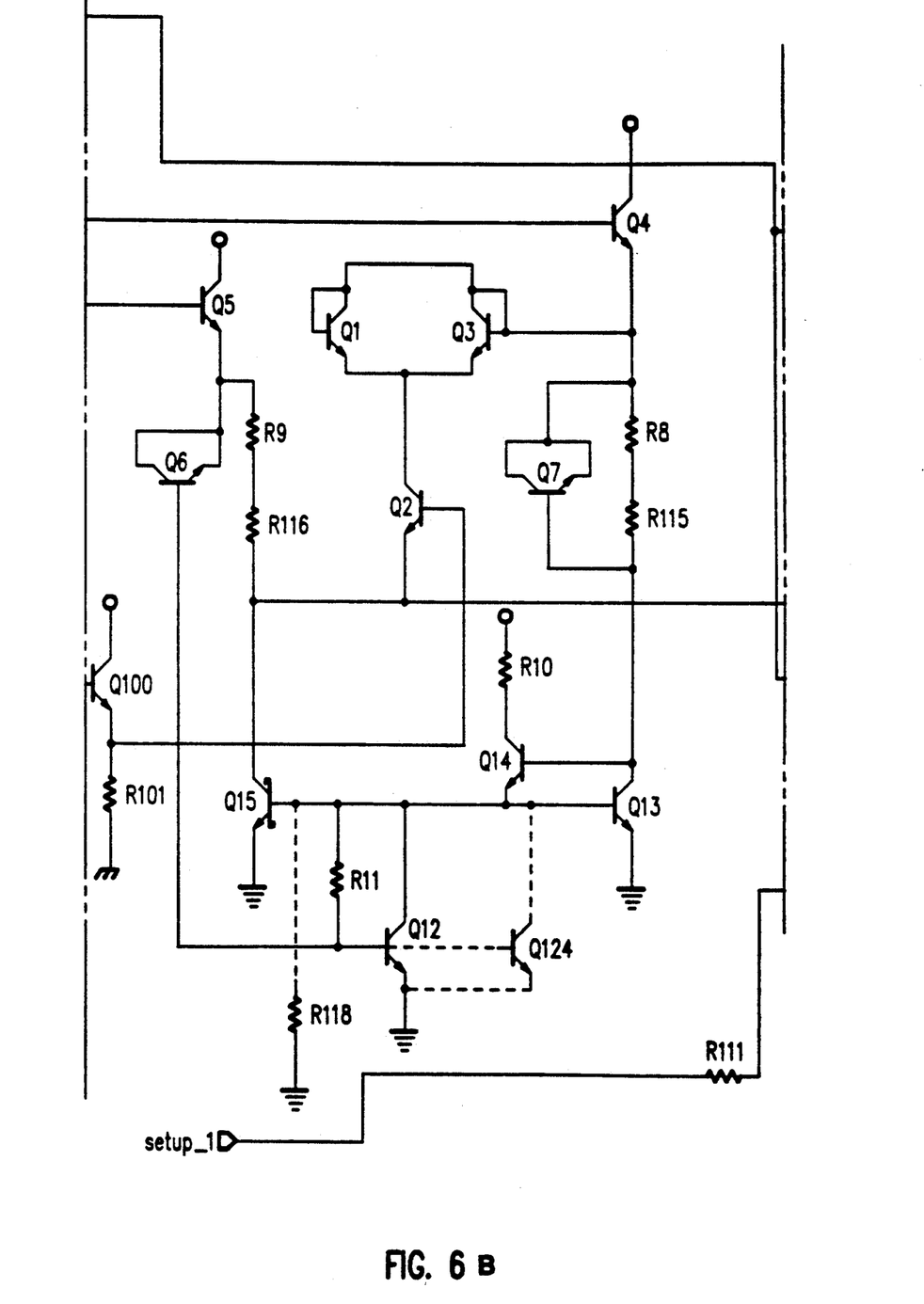
Figure 6C:
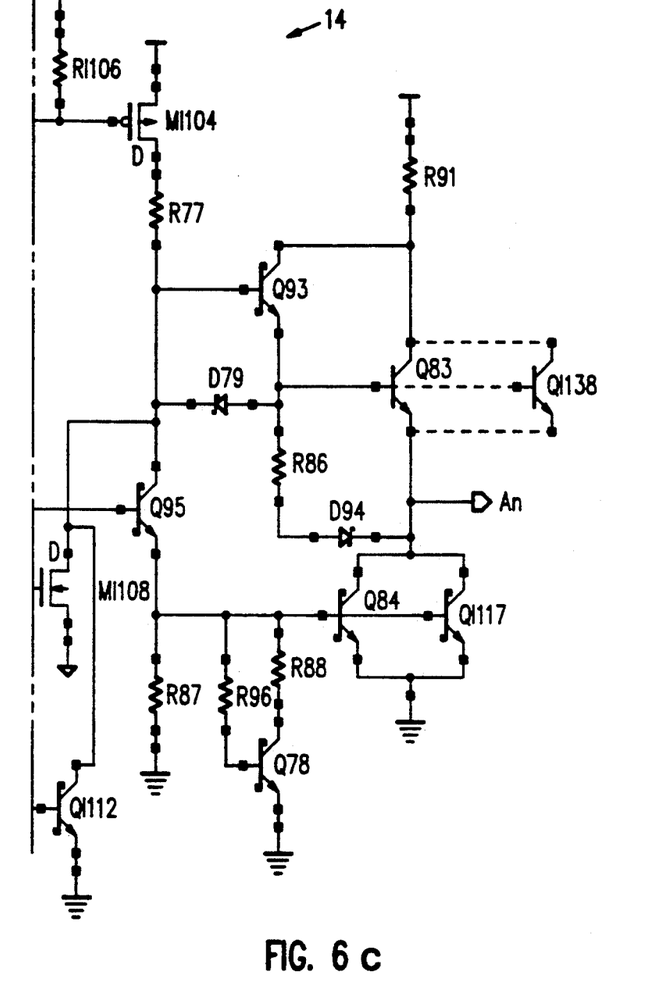

The receiver 14 of transceiver 10, an embodiment of which is shown in FIG. 6, includes two input stages, one ECL to TTL translator and a TTL output buffer.

As further shown in FIG. 6, Schottkey diodes D35/D36 are used to block the current path to the supply Vcc when it is being grounded. The second input stage adds additional gain.

In the ECL to TTL translator, ECL to TTL speed-up capacitor transistor Q6 connects to the base of transistor Q12, rather than to the collector of transistor Q15 in the conventional way. This scheme reduces capacitance associated with phase split transistor Q95.

The output TTL buffer essentially consumes zero power during tri-state by the "off" state of P-channel transistor M104 and the "on" state of N-channel transistor M108.

The tri-state control signal is provided by the disable signal shown in FIG. 6A. As shown in FIGS. 6A, 6B and 6C, the disable signal controls the on/off state of device M108 and cut-off device M104.

Additionally, the TTL output buffer relies on the backplane transceiver logic ground as ground return, rather than the logic ground in the conventional manner which causes ground bounce due to TTL current spikes. Thus, noise is minimized, the data is more dependable because ground bounce is reduced, and channel-to-channel skew is reduced.

Figure 7A:
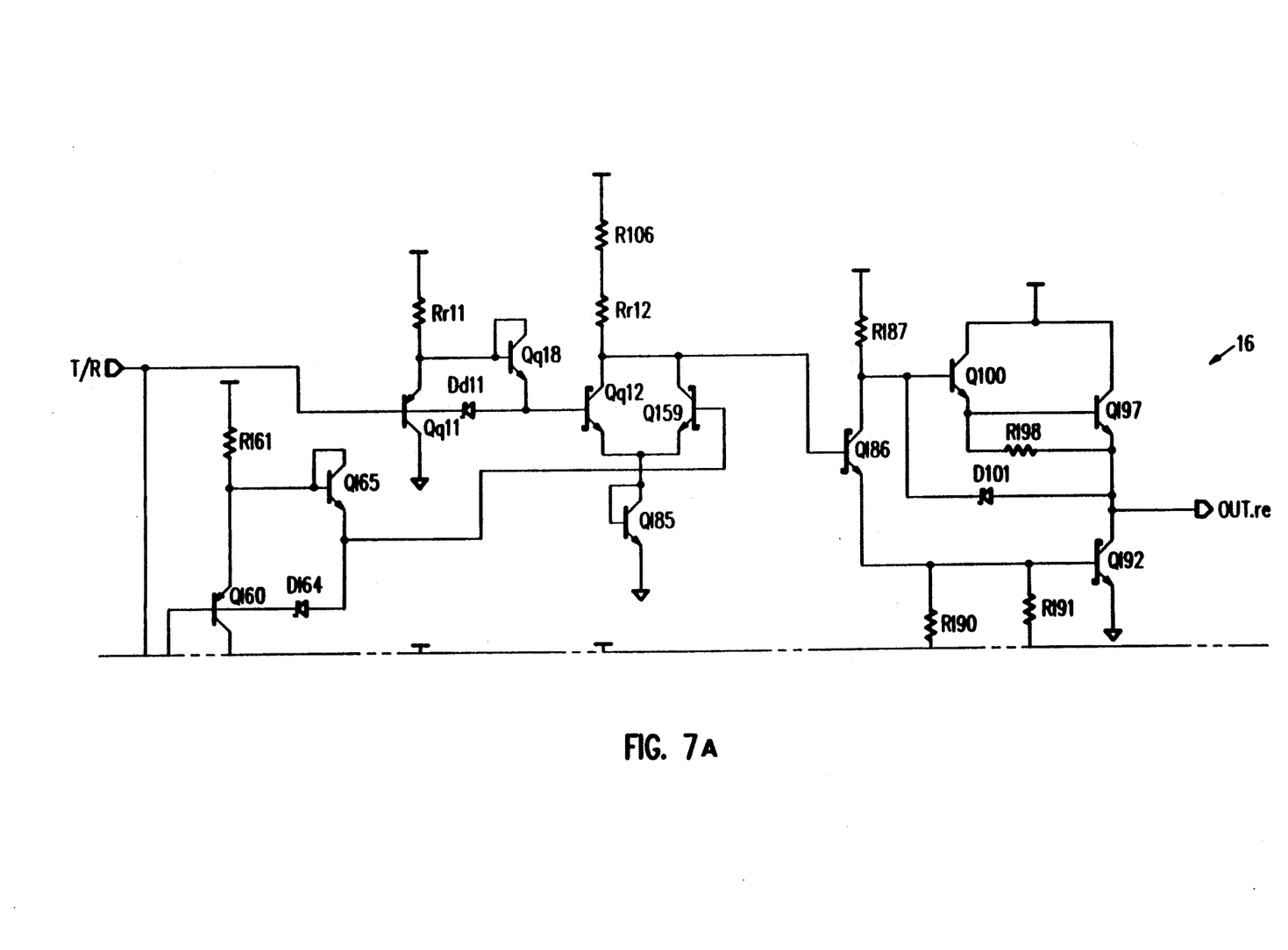
FIGS. 7A-7B are schematic diagrams illustrating a CD & T/A circuit utilizable in the data transceiver shown in FIG. 3.
Figure 7B:
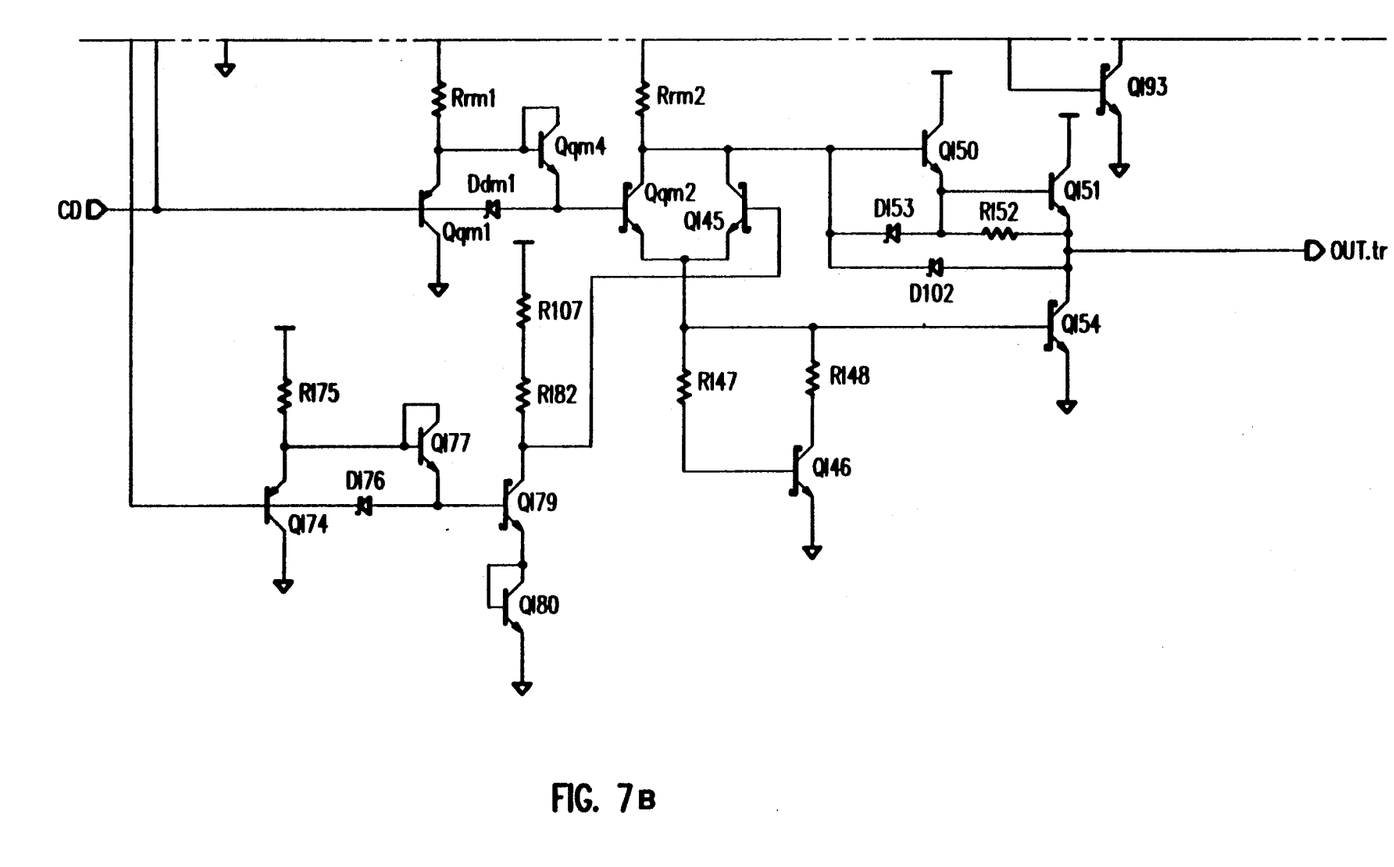

FIG. 7 provides an embodiment of conventional CD and T/A logic 16 utilizable in a data transceiver 10 in accordance with the present invention.

Figure 8:
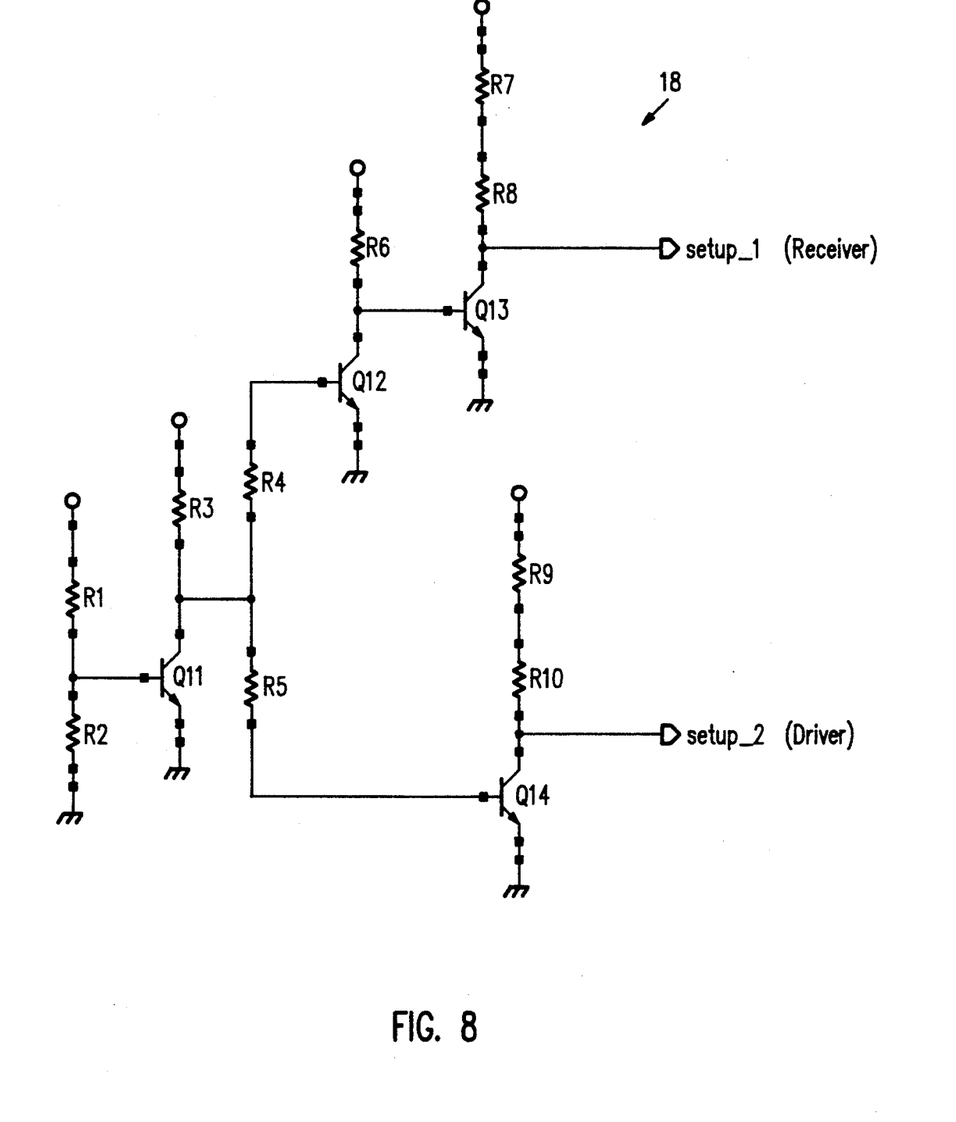
FIG. 8 is a schematic diagram illustrating a setup circuit utilizable in the data transceiver shown in FIG. 3.

FIG. 8 provides a schematic embodiment of conventional setup circuitry 18 utilizable in a data transceiver 10 in accordance with the present invention.

Figure 9:
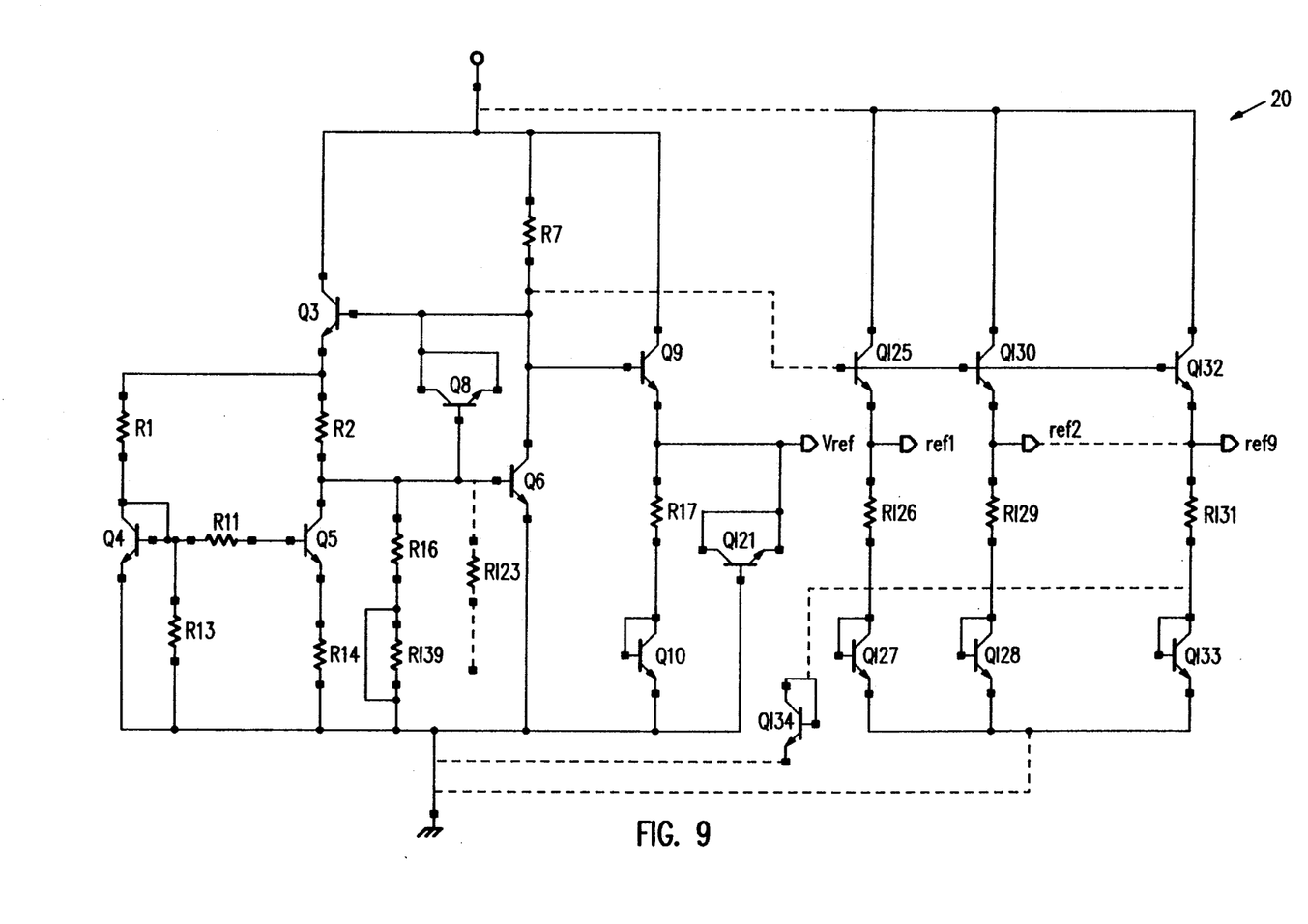
FIG. 9 is a schematic diagram illustrating a bandgap circuit utilizable in the data transceiver shown in FIG. 3.

FIG. 9 provides a schematic embodiment of conventional bandgap circuitry 20 utilizable in a data transceiver 10 in accordance with the present invention.

It should be understood that various alternatives to the embodiments of the invention described herein may be employed in practicing the invention. It is intended that the following claims define the scope of the invention and that methods and apparatus within the scope of these claims and their equivalents be covered thereby.

What is claimed is:

1. Bias voltage regulator circuitry utilizable for providing a bias voltage signal to a driver stage of a high speed data transceiver, the bias voltage regulator circuitry comprising:

(a) a serial string that includes a plurality of diode-connected transistors and a resistive element serially connected between a supply voltage and ground;

(b) a resistive network connected in parallel with the serial string between the supply voltage and ground, the resistive element having a resistance which is an integer multiple of the resistance of the resistive network; and (c) a npn output transistor having its collector connected to the supply voltage, its base connected in common with the resistive network and ground, and its emitter connected to provide the bias voltage signal whereby the bias voltage signal is independent of the value of the supply voltage and changes inversely with temperature.

2. Bias voltage regulator circuitry as in claim 1 wherein the serial string has a voltage drop of 5 $V_{BE}$ and the resistance of the resistive element in the serial string is eight times the resistance of the resistive network whereby the bias voltage signal remains 4 $V_{BE}$ above ground.

3. Driver stage circuitry utilizable in a high speed data transceiver, the driver stage circuitry comprising:

(a) an input node that receives a driver stage data input signal;

(b) an output node that provides a driver stage output signal;

(c) an n-channel output transistor that provides the driver stage output signal to the driver node;

(d) switching means connected between the input node and the base of the n-channel output transistor such that when the input signal is logic high, the switching means provides base driver to the n-channel output transistor to turn on said output transistor, and when the input signal is logic low, the switching means holds the output transistor off; and (e) first capacitive means connected between the input node and the switching means for providing current to the base of the n-channel output transistor when the input signal transitions from logic low to logic high.

4. Driver stage circuitry in claim 3 and further comprising second capacitive means connected between the switching means and the output node for controlling the slew rate of the driver stage output signal.

5. Driver stage circuitry as in claim 3 and further comprising:

(a) discharge capacitive means connected to the base of the n-channel output transistor; and (b) an output switch connected between the discharge capacitive means and ground and responsive to a high-to-low transition of the data input signal for discharging the discharging the discharge capacitive means whereby the discharge path from the base of the output transistor to ground via the discharge capacitive means and the output switch provides fast turn-off for the output transistor.

6. Receiver circuitry utilizable in a high speed data transceiver, the receiver circuitry comprising:

(a) an input node for receiving a receiver input signal;

(b) input stage means connected to the input node for converting the receiver input signal to a corresponding ECL differential signal pair comprising a first ECL signal and a second ECL signal;

(c) ECL-to-TTL converter means responsive to the ECL differential signal pair for providing a corresponding TTL logic level signal, the ECL-to-TTL converter means including (i) a first npn converter stage input transistor having its collector connected to a supply voltage, its emitter connected to an internal node, and its base connected to receive the first ECL signal;

(ii) a second npn converter stage input transistor having its collector connected to the supply voltage and its base connected to receive the second ECL signal;

(iii) capacitive means connected to the emitter of the first converter stage input transistor;

(iv) discharge means connected between the capacitive means and ground and between the emitter of the second converter stage input transistor and ground whereby a high-to-low transition of the first ECL signal causes the internal node to go to a TTL low logic level and a low-to-high transition of the first ECL signal causes the internal node to go to a TTL high logic level.

7. Receiver circuitry as in claim 6 and further including a TTL output buffer that comprises:

(a) a npn phase split transistor having its base connected to the internal node, its emitter coupled to ground and its collector coupled to an output node;

(b) a n-channel pull-down transistor having its drain connected to the collector of the phase split transistor, its source connected to ground and its gate coupled to a disable node such that an active high disable signal applied to the disable node turns on the pull-down transistor thereby placing the output node in a high impedance state; and (c) a p-channel cut-off transistor having its source connected to the supply voltage, its drain coupled to the collector of the phase split transistor and its gate connected to the disable node such that the active high disable signal applied to the disable node turns off the cut-off transistor thereby causing the output buffer to consume zero power when the output node is in the high impedance state.

8. Receiver circuitry as in claim 7 wherein the TTL output buffer relies on backplane transceiver logic ground as ground for the receiver circuitry.

* * * * *